United States Patent
Bakshi

(10) Patent No.: US 7,815,200 B2
(45) Date of Patent: Oct. 19, 2010

(54) MEDICAL IMAGING LEVELING

(75) Inventor: Nikesh Bakshi, Granger, IN (US)

(73) Assignee: Actuant Corporation, Butler, WI (US)

( * ) Notice: Subject to any disclaimer, the term of this patent is extended or adjusted under 35 U.S.C. 154(b) by 286 days.

(21) Appl. No.: 11/940,779

(22) Filed: Nov. 15, 2007

(65) Prior Publication Data

US 2009/0127531 A1  May 21, 2009

(51) Int. Cl.
*B60G 17/00* (2006.01)
(52) U.S. Cl. .................... 280/6.153; 280/6.16
(58) Field of Classification Search .............. 280/6.153, 280/6.157, 6.16, 6.15
See application file for complete search history.

(56) References Cited

U.S. PATENT DOCUMENTS

| | | | |
|---|---|---|---|
| 4,570,733 A * | 2/1986 | Star | 180/41 |
| 4,784,400 A * | 11/1988 | Hofius | 254/93 VA |
| 5,676,385 A | 10/1997 | Schneider et al. | |
| 5,915,700 A * | 6/1999 | Schneider et al. | 280/6.153 |
| 6,176,495 B1 * | 1/2001 | Decker | 280/6.153 |
| 6,584,385 B1 * | 6/2003 | Ford et al. | 701/36 |
| 7,025,361 B1 | 4/2006 | Erickson | |
| 7,066,474 B2 | 6/2006 | Hiebert et al. | |
| 7,226,057 B2 * | 6/2007 | Eichhorn et al. | 280/6.153 |
| 7,294,797 B2 * | 11/2007 | Erickson | 200/18 |
| 7,389,994 B2 * | 6/2008 | Trudeau et al. | 280/6.153 |
| 7,407,189 B2 | 8/2008 | Hiebert et al. | |
| 2005/0110229 A1 * | 5/2005 | Kimura et al. | 280/5.514 |
| 2008/0272562 A1 * | 11/2008 | Sabelstrom et al. | 280/6.153 |

FOREIGN PATENT DOCUMENTS

WO    WO 2006135326 A1 * 12/2006

* cited by examiner

*Primary Examiner*—Ruth Ilan
*Assistant Examiner*—Drew Brown
(74) *Attorney, Agent, or Firm*—Quarles & Brady LLP

(57) ABSTRACT

A high accuracy medical trailer leveling system capable of detecting at least three level orientations including level along a longitudinal direction, level along a lateral direction at the front of the trailer, and level along a lateral direction at the rear of the trailer. The system also includes sensors that detect a level orientation in the longitudinal direction at the front of the trailer and a level orientation in the longitudinal direction at the rear of the trailer. A touch pad has buttons for controlling the system and a display screen, the display screen being capable of displaying a level condition in a particular location of the trailer and direction. The display screen can display the level orientation of side to side, front; side to side, rear; and front to back, and can also display the angle of inclination. One set of lights on the control pad indicates which jacks to actuate to level the vehicle, and another set of lights indicates which jacks are being actuated.

9 Claims, 4 Drawing Sheets

MEDICAL IMAGING LEVELING

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to a method of leveling a mobile trailer that contains medical imaging or other clinical equipment.

BACKGROUND OF THE INVENTION

In the area of recreational vehicles such as travel trailers and motor homes, and other general transportable vehicles, there is a need for leveling when these vehicles are parked for use. Recreational vehicles and campers are usually parked in campsites where the parking area is not always level. Various systems are found in the prior art relating to leveling such vehicles. These systems comprise at least a lift mechanism and a level sensing device. Generally, the designs use mechanical, electromechanical, or hydraulic jacks and level sensors for leveling the vehicles. The devices are strategically mounted to the underbody or chassis of the vehicle to achieve the leveling quickly and efficiently. The number of jacks and level sensors used in each application are dependent on the size of the vehicle and the weight of the vehicle being supported, among other things. In one example, a recreational vehicle is equipped with four jacks in the form of hydraulic cylinders mounted to the vehicle frame. Two jacks are located adjacent to the rear of the vehicle and two jacks are located adjacent to the front of the vehicle.

In another example, a vehicle leveling system has three jacks, two of which are located at the rearward end of the vehicle and one of which is located at the forward end of the vehicle. The use of a single front jack reduces twisting of the vehicle frame, however, it makes the system less stable because two corners of the vehicle are left unsupported.

There is a need for transportable medical equipment in our society today. In areas where medical facilities are not readily accessible, or in areas that experienced disaster and the infrastructure is in a state of disrepair, a mobile medical facility is essential. Manufacturers are sensitive to this need and are providing equipment to meet this demand. Transportable medical equipment trailers are known in the prior art. The need for leveling of these equipment trailers is greater than for the recreational vehicles and campers because of the sophistication and the sensitivity of the medical equipment. Types of equipment used in a transportable medical trailer include, PET/CT scan machines, MRI machines, and CT machines The medical equipment transported in a mobile unit can include at least two machines mounted together such as PET/CT machine. These machines need to be aligned prior to operation. Any deviation from the recommended alignment of the machines in the trailer could result in parallax errors, and possibly, error in diagnosis.

These trailers are typically towed behind a semi-tractor and dropped off at a clinical location. The front jacks will be used to lift and support the front of the trailer when it is detached from the tow vehicle and the driver will initially level the trailer, and then leave. Through the course of the day, as environmental conditions change, the level of the trailer may change and need to be re-leveled. It is important that medical clinical personnel be able to perform this function as conditions change, or else use of the machines in the trailer may have to be suspended until the trailer can be re-leveled.

The current invention addresses the shortcomings of the prior art.

SUMMARY OF THE INVENTION

The invention provides a high accuracy medical trailer leveling system capable of detecting at least three level orientations including level along a longitudinal direction, level along a lateral direction at the front of the trailer and level along a lateral direction at the rear of the trailer.

The system may have sensors that detect a level orientation in the longitudinal direction at the front of the trailer and a level orientation in the longitudinal direction at the rear of the trailer, in addition to the functions of those sensors detecting lateral level at the front and rear.

A touch pad of the system preferably has buttons for controlling the system and a display screen, the display screen being capable of displaying a level condition in a particular location of the trailer and direction. The display screen can display the level orientation of side to side, front; side to side, rear; and front to back, and can also display the angle of inclination.

In another preferred aspect, one set of lights on the control pad indicates which jacks to actuate to level the vehicle, and another set of lights indicates which jacks are being actuated.

These particular objects and advantages may apply to only some embodiments falling within the claims and thus do not define the scope of the invention.

BRIEF DESCRIPTION OF THE DRAWINGS

Like reference symbols in the various drawings indicate like elements.

DETAILED DESCRIPTION OF THE PREFERRED EMBODIMENT

Figure 1:
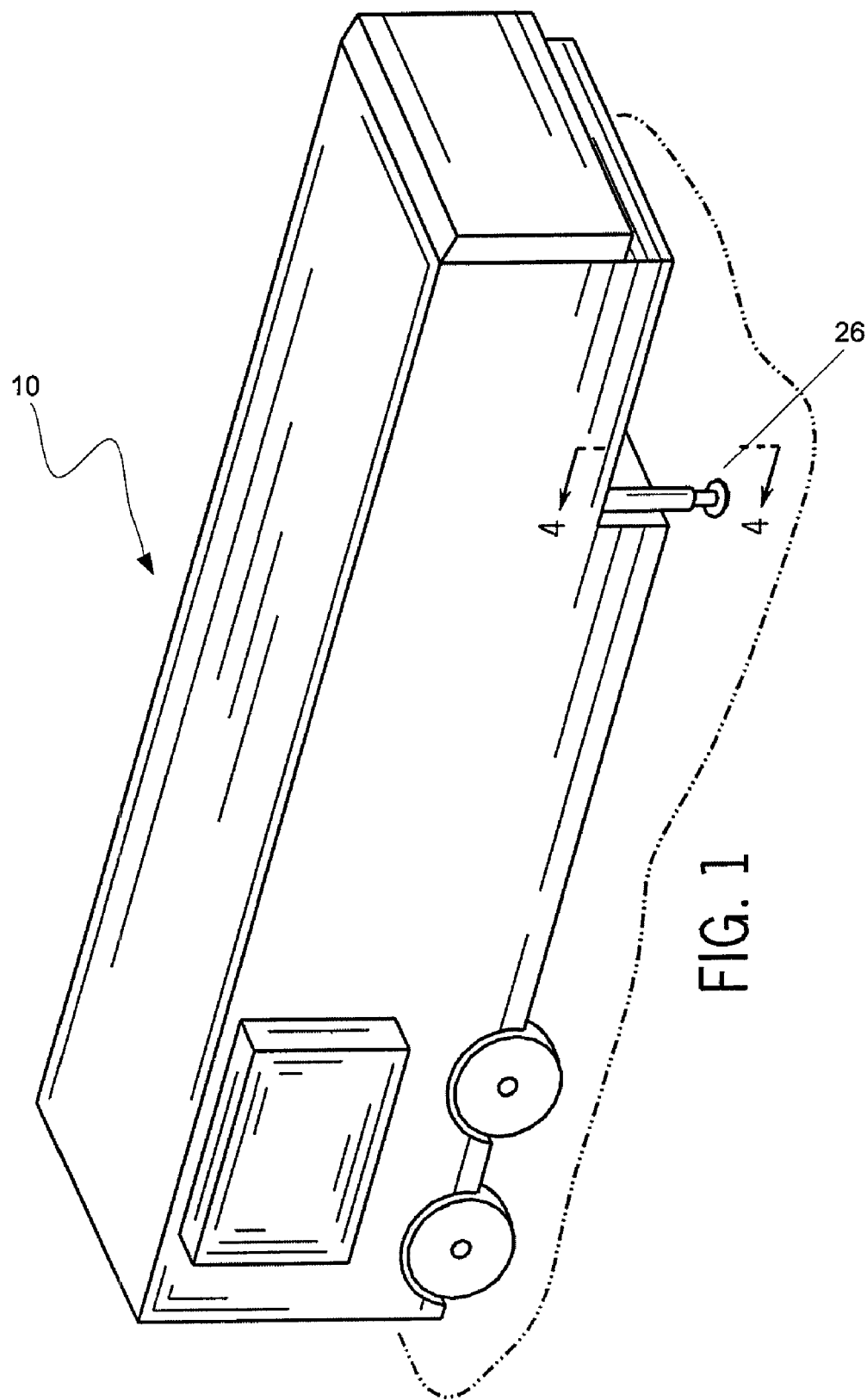
FIG. 1 is a trailer used in conjunction with the present invention.
Figure 2:
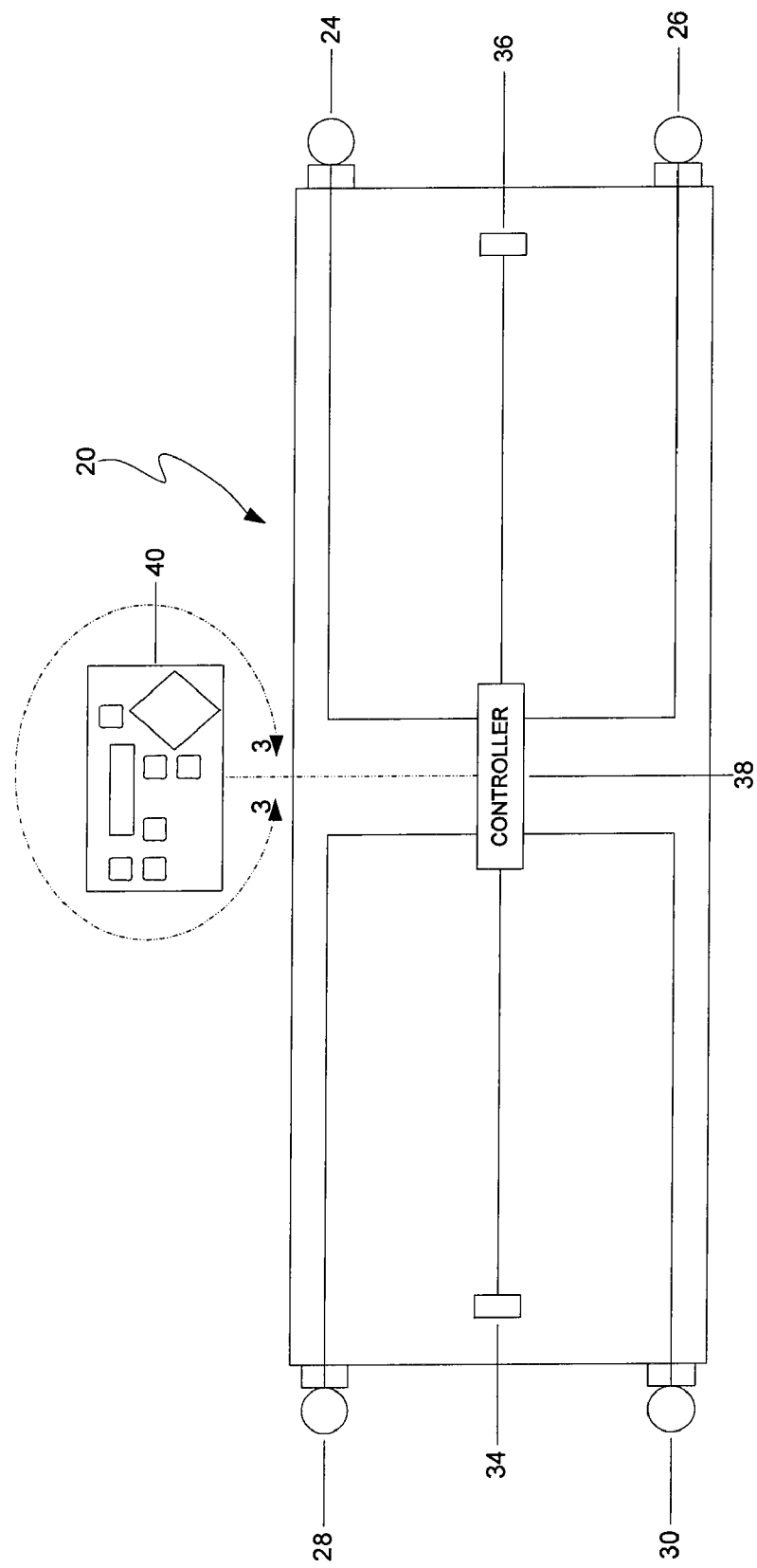
FIG. 2 is a diagram of a controller and level sensors according to the present invention.

Referring to FIG. 1, a representation of a medical equipment trailer 10 useful for the present invention is shown. Also shown in FIG. 1 is a lift mechanism 26 located at the front right side of medical equipment trailer 10. Lift mechanism 26 is one of a plurality of lift mechanisms that are employed in this system. The present invention employs at least four lift mechanisms, including mechanisms 24, 26, 28, and 30, (FIG. 2). The operation of the lift mechanisms will be discussed in more detail with reference to FIGS. 2 and 4. Included in the medical equipment trailer 10 is a chassis structure 20 (not shown) that will also be discussed in more detail with reference to FIG. 2. Chassis structure 20 represents the structural frame of medical equipment trailer 10, on which the equipment inside the trailer is supported and to which the walls, wheels and lift mechanisms are mounted.

Referring to FIG. 2, a depiction of trailer chassis structure 20 is shown. Chassis structure 20 contains lift mechanisms 24, 26, 28, and 30 that are used in part to level medical equipment trailer 10. Lift mechanisms 24 and 26 are located at the front end of medical equipment trailer 10 and serve as landing gear. Landing gear should be understood to be the front lift mechanisms that are extended prior to detaching trailer 10 from the truck. Lift mechanism 26 is located at the right hand side and lift mechanism 24 on the left hand side. Lift mechanisms 28 and 30 are located at the rear end of medical equipment trailer 10 with lift mechanism 28 located on the left hand side and lift mechanism 30 on the right hand side. Activation of lift mechanisms 24, 26, 28, and 30 are initiated from touchpad 40. The lift mechanisms can be activated individually or in pairs. More details on the operation of touchpad 40 are given with reference to FIGS. 3-3A.

Still referring to FIG. 2, the present invention uses two bidirectional level sensors 34 and 36, located at the front and rear of medical equipment trailer 10. The level sensors used in this invention are known in the art and can include bubble level sensors, accelerometers, or any other type that detects a level mismatch. Each sensor senses longitudinal (front-rear) level and also senses lateral (side to side) level, so each sensor is oriented in the trailer to have one of its axes lined up with the longitudinal axis of the trailer and the other axis of the sensor lined up with a lateral axis of the trailer. Preferably, the sensors are on or close to the lateral center of the trailer. Alternatively, if unidirectional sensors were used, four sensors could be used, one longitudinally oriented and one laterally oriented at each end of the trailer.

With bi-direction sensors, level sensor 36 is located at the front end of medical equipment trailer 10 and is used in conjunction with lift mechanisms 24 and 26 to make level adjustments to the front end of medical equipment trailer 10 for proper functioning of the equipment housed in medical equipment trailer 10. Conversely, level sensor 34 is located at the rear end of medical equipment trailer 10 and is used in conjunction with lift mechanisms 28 and 30 to attain the recommended leveling. Both level sensor 34 and level sensor 36 are used to ensure that medical equipment trailer 10 is level relative to a horizontal plane as determined by gravity. Level sensors 34 and 36 are configured for accuracy levels of 0.1° front to rear, 0.05° side to side (left to right) in the front, and 0.05° side to side (left to right) in the rear of medical equipment trailer 10. These accuracy limits are relative to the horizontal plane. Also shown in FIG. 2 is a controller 38 remotely attached to level sensors 34 and 36. Controller 38 is used in conjunction with lift mechanisms 24, 26, 28, and 30 to process level information from sensor 34 and sensor 36 to screen 52, as well as receive input commands from keypad 40 and provide outputs thereto. Controller 38 may be positioned inside a compartment that is accessible from outside of the trailer, and another controller 38 (not shown) could be provided inside the trailer.

Medical equipment trailer 10 will generally weigh in excess of 50,000 lbs., with the bulk of the weight concentrated toward the rear end. The front of medical equipment trailer 10 is reserved for such things as a waiting area, prep area, and computer equipment. Because of the weight of medical equipment, trailer 10 and the installed machines and its distribution, it is inherently difficult to achieve the system level within tolerance limits which permit proper functioning of the installed machines. Advantageously using two bidirectional level sensors 34 and 36, and strategically placing level sensor 36 at the front end and level sensor 34 at the rear end of medical equipment trailer 10, helps to substantially reduce twist, and compensate for it during leveling. Twist is regarded as the deformation of chassis 20 as a result of overly extending any one corner relative to the diagonally opposite corner. Level sensor 36 is used in conjunction with both lift mechanism 24 and lift mechanism 26 to achieve and maintain the recommended level position for the front end of medical equipment trailer 10. Likewise, level sensor 34 is used in conjunction with both lift mechanism 28 and lift mechanism 30 to achieve the recommended level states for the rear end of medical equipment trailer 10. Twist is minimized by maintaining a zero level between level sensor 36 and level sensor 34. Zero level should be understood to mean that the two sensors are equal elevation above the ground and the sides of each sensor are equal elevation above the ground.

Figure 3:
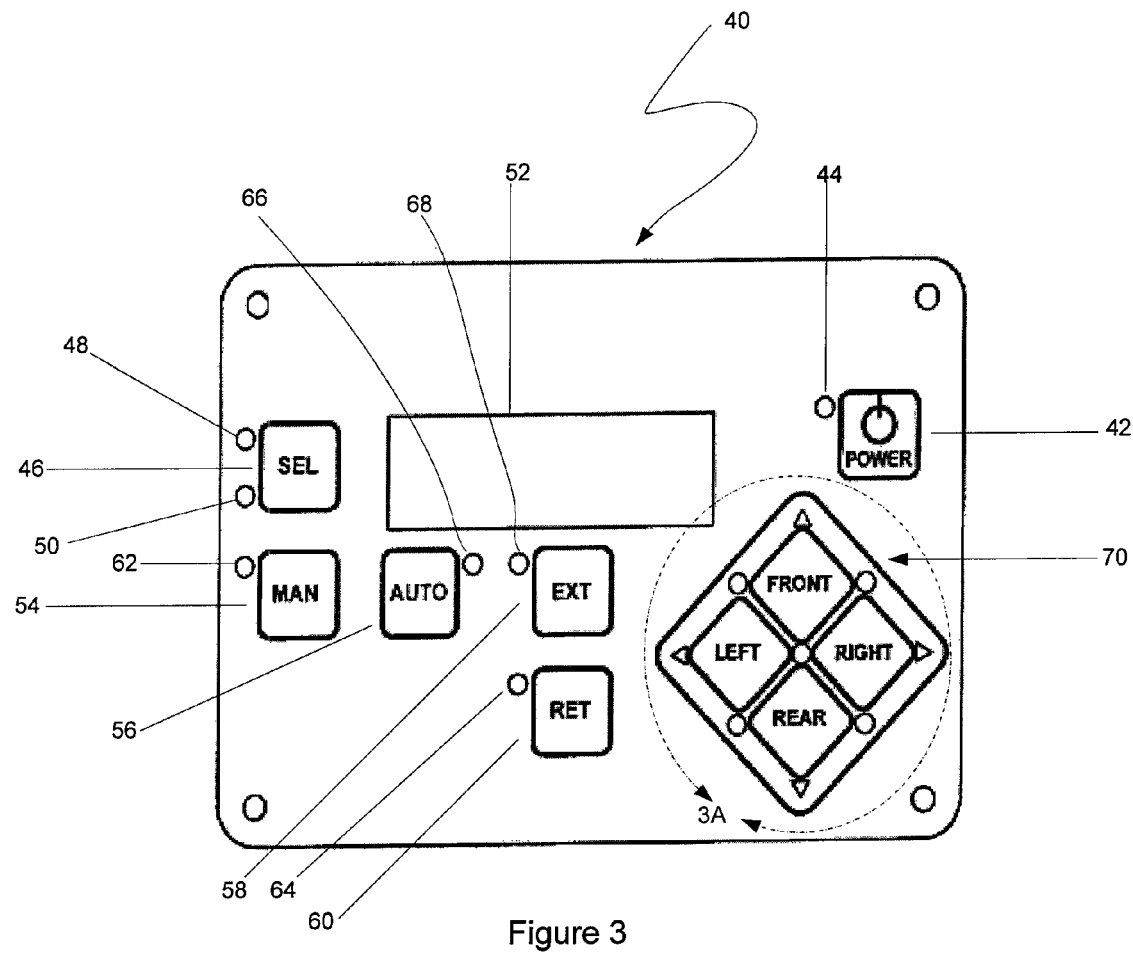
FIG. 3 is a plan view of the medical trailer leveling touchpad of FIG. 2.

Referring to FIG. 3 a touchpad 40 for use in the leveling operation of medical equipment trailer 10 is shown. Touchpad 40 is enclosed in an accessory panel that is mounted on the side of medical equipment trailer 10. The accessory panel (not shown) is accessible from outside of medical equipment trailer 10. Touchpad 40 is activated by pressing power button 42. Amber LED 44, when illuminated, indicates that power is on and touchpad 40 is ready for operation. Screen 52 displays the leveling states of the trailer. Select button 46 is used for scrolling through the displayed information on touchpad screen 52. Green LED 48, when illuminated, indicates that medical equipment trailer 10 is level. Red LED 50, when illuminated, indicates that medical equipment trailer 10 is not level. If Red LED 50 is illuminated, error messages will be shown on screen 52, including, low voltage, end of stroke, pump time out, etc. Select button 46 is additionally used to cycle through three defined states of leveling. The three states of level are side to side front, side to side rear, and front to rear.

Still referring to FIG. 3, auto button 56 is used to initiate the automatic level cycle for medical equipment trailer 10. Amber LED 66, when illuminated, indicates that auto button 56 is activated. In certain examples, automatic leveling is the first option used once medical equipment trailer 10 is parked in its working location. Lift mechanisms 24 and 26 are extended by activating manual button 54 in conjunction with extend button 58. It is recommended that lift mechanisms 24 and 26 be extended prior to removing from the truck. Lift mechanisms 24 and 26 serve as landing gear. With lift mechanisms 24 and 26 extended, the automatic leveling cycle can be initiated by pressing auto button 56. The leveling states information is transmitted from level sensor 36 in conjunction with lift mechanisms 24 and 26 through controller 38 and displayed on touchpad screen 52. Level state is annunciated by the illumination of green LED 80 and message "Platform Level". Green LED 80 remains illuminated as long as the trailer 10 is level.

Referring again to FIG. 3, manual button 54 is used to initiate the manual leveling of medical equipment trailer 10. Manual leveling is required when auto leveling does not attain the required accuracy level for proper functioning of medical equipment trailer 10. For example, if the front jacks need to be extended extraordinarily to detach the tow vehicle, it may be necessary to manually lower the front of the trailer before attempting automatic leveling of the trailer. Activation of manual button 54 is confirmed by the illumination of amber LED 62. In manual mode, extend button 58 and retract button 60 can be pressed to extend or retract, respectively, individual pairs of lift mechanisms 24 and 26, or 28 and 30. Extend button 58 facilitates the manual extension of lift mechanisms 24, 26, 28, and 30 in pairs. For example, front button 72 extends jacks 24 and 26, left button 78 extends jacks 24 and 28, right button 74 extends jacks 26 and 30 and rear button 76 extends jacks 28 and 30. The jacks may also be extended individually, if for example the front and right buttons pressed simultaneously and held down result in only jack 26 extending. Activation of extend button 58 is confirmed by the illumination of amber LED 68. Retract button 60 is used to retract lift mechanism 24, 26, 28, and 30 in manual mode, indicated by LED 62 and LED 64. When manual button 54 and retract button 60 are actuated as indicated by the two LEDs 62 and 64, the directional keypad 70 works similarly to the way it works in manual extension mode, described above, to retract the jacks in pairs or individually.

Figure 3A:
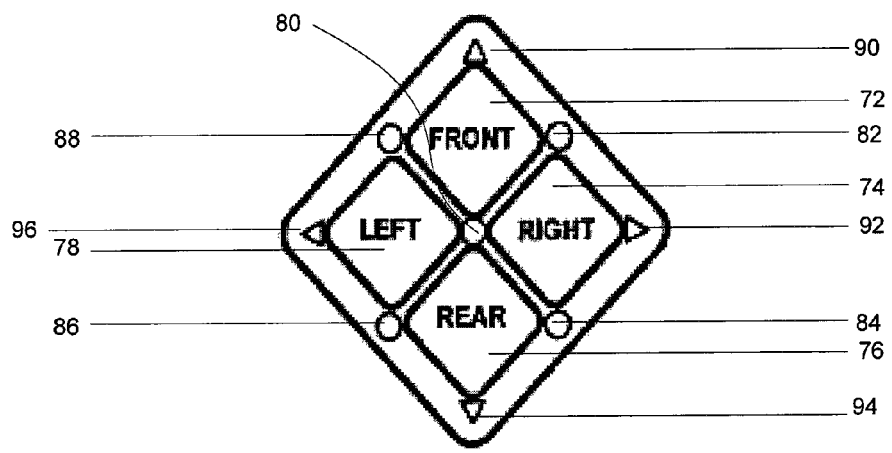
FIG. 3A is a detail view of the directional keypad portion of the touchpad of FIG. 3.

Referring to FIG. 3A, keypad 70 contains directional buttons front 72, right 74, rear 76, and left 78, which are momentary contact switches. Keypad 70 also shows status LEDs 80, 82, 84, 86, and 88 used in conjunction with the directional buttons in both auto and manual leveling of medical equipment trailer 10. Keypad 70, used in conjunction with touchpad screen 52, is used to attain the desired accuracy level for medical equipment trailer 10. Directional buttons and LEDs on keypad 70 can be used to 'fine tune' the level states. In one example, screen 52 displays that the side to side rear is not level. Pressing left button 78 along with rear button 76 simultaneously engages lift mechanism 28 resulting in side to side rear achieving the desired accuracy level.

LED 80 lights when the system indicates level in all three orientations—front side to side, rear side to side and front to back. LEDs 82, 84, 86 and 88 light up when the jack they correspond to is being actuated. Their position on the keypad also indicates which corner of the trailer they are positioned at. Thus, LED 82 is between the front 72 and right 74 buttons and actuates the jack 26 which is at the front right corner of the trailer. Pressing buttons 72 and 74 lights up only LED 82 and actuates only jack 28. This is the same for each of the jacks 24, 26, 28 and 30, and the corresponding LEDs 88, 82, 86 and 84.

LEDs 90, 92, 94 and 96 light up in the shape of arrows to indicate to the user which button to press to bring the trailer into level state in the manual mode. Thus, if the rear is lower than the front, LED 94 will light and user will press rear button 76 until LED 94 goes out.

Figure 4:
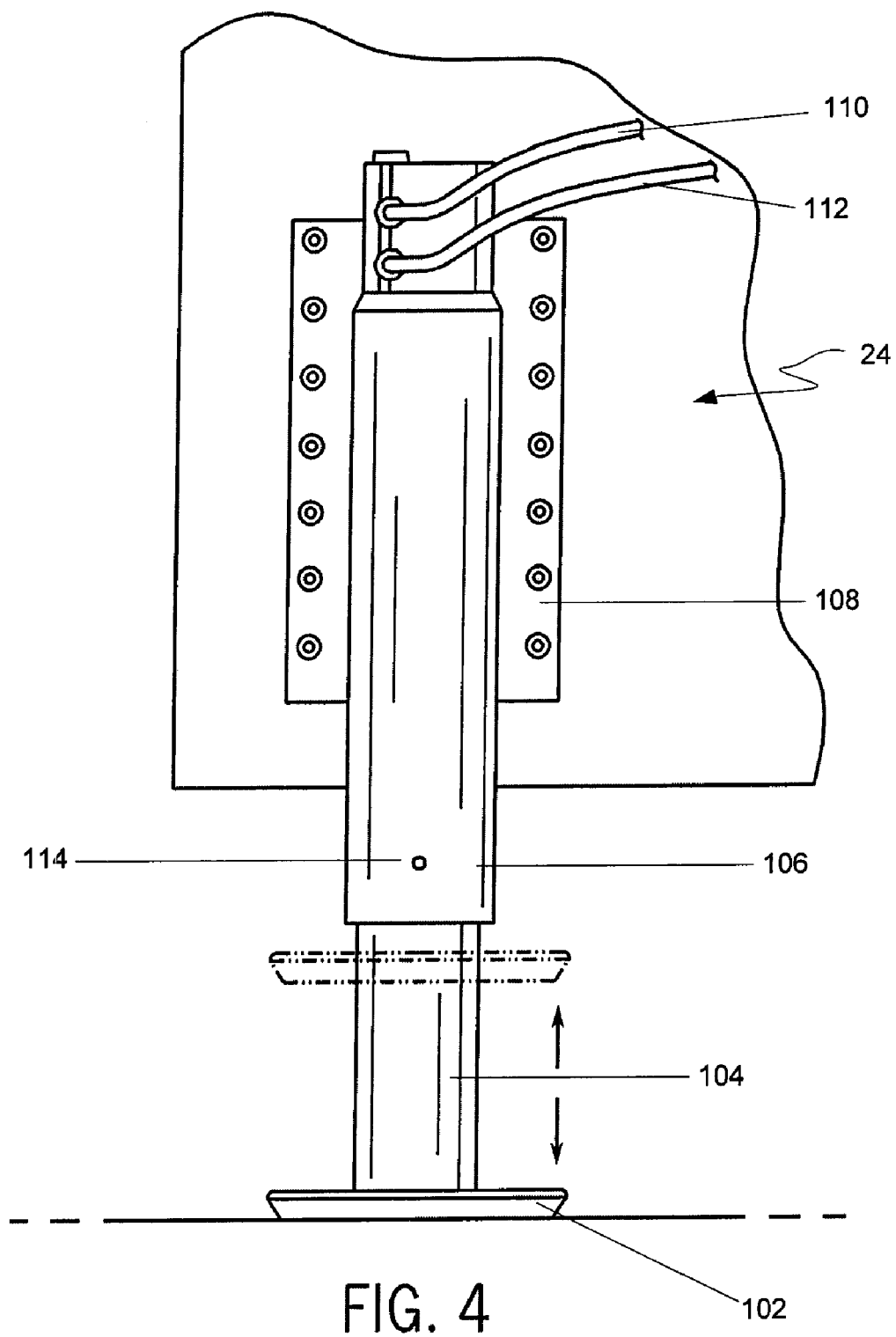
FIG. 4 is a plan view of the lift mechanism of FIG. 1.

Referring to FIG. 4, lift mechanism 24 of FIGS. 1-2 is shown. FIG. 4 is discussed here as a single lift mechanism 24; however, the discussion applies equally to lift mechanisms 26, 28, and 30 as the devices and components are the same. Lift mechanism 24 can be any type of electromechanical jack, hydraulic jack, pneumatic jack or screw type jack.

In one embodiment, lift mechanism 24 is a hydraulic jack comprising a support base or foot 102, an extending member or ram 104, a housing 106, a mounting support member 108, an extend tube 110, and a retract tube 112. Support base 102 is used in the extend position of hydraulic jack 24 and is generally wider than the extending member 104 to reduce pressure applied to the ground. In the retracted position, support base 102 is lifted off the ground and positioned at a safe height for transportation. The ground clearance for each jack is 8 inches in the preferred embodiment.

In the extended position, jack 24, in conjunction with jacks 26, 28, and 30 are used to support the weight of medical equipment trailer 10 and elevate it far enough to achieve all three level states discussed above: front lateral level, rear lateral level and longitudinal level. Also shown in FIG. 4 is housing 106 which contains a grease port 114. Attached to housing 106 is supporting bracket 108 containing a plurality of mounting holes for fixedly attaching jack 24 to the frame of medical equipment 10. Extend tube 112 is used to communicate pressurized hydraulic fluid to and from the bore side of cylinder housing 106 to facilitate jack extension. Retract tube 110 is used to communicate pressurized hydraulic fluid to and from the rod side of cylinder housing 106 to facilitate jack retraction. A heavy duty motor with a 50% duty cycle may be used to drive a pump to move hydraulic fluid between a reservoir and the jacks 24, 26, 28 and 30.

The pump in this example has a flow rate of 0.25-0.40 gal/min at an operating pressure of 100 psi (no load) and a flow rate of 0.17-0.30 gal/min at an operating pressure of 2000 psi (typical load). These are small flow rates in comparison to other vehicle leveling systems because the accuracy of leveling required in this system is relatively high. As it takes time from the time that a level sensor detects a level or out of level orientation until an electrical valve controlled by the controller can be turned on or off, using a lower flow rate reduces the error introduced by the amount of time it takes. Accordingly, it is desirable to use a relatively low flow rate in practicing the present invention. The lift mechanism is not limited to the description given here. Other suitable embodiments will be apparent to anyone having ordinary skill in the art given the benefit of this disclosure.

A drawback to using a low flow rate pump for actuating hydraulic lift mechanisms 24, 26, 28 and 30 in the present invention is the amount of time it takes to move the jacks between the fully retracted and the touch-down positions, when there is no significant load on the jacks. One solution to this problem is using a two stage pump, that has a higher flow rate at low pressures, e.g., below 500 psi, and a lower flow rate at higher pressures, e.g., above 500 psi. The pump can incorporate a check valve so that it automatically shifts to the low flow, rate, high pressure mode when the load pressure exceeds the preset value, e.g. 500 psi.

Any suitable hydraulic circuit may be used for controlling the actuators 24, 26, 28 and 30. Such circuits usually include one or two solenoid valves per jack, a pump, a reservoir and other valves, orifices or devices to assure operation of the system. Such systems are well known in the art, as are controllers for controlling such systems, and the programming of such controllers.

It is specifically intended that the present invention not be limited to the embodiments and illustrations contained herein, but include modified forms of those embodiments including portions of the embodiments and combinations of elements of different embodiments as come within the scope of the following claims.

I claim:

1. A medical equipment trailer, comprising:
    a chassis configured to support medical equipment, the chassis having a front, a rear, a longitudinal direction extending between the front and the rear, and a lateral direction generally perpendicular to the longitudinal direction;
    a plurality of wheels rotatably connected to the chassis;
    a plurality of lift mechanisms connected to the chassis and configured to move the chassis relative to a surface supporting the trailer;
    a first one or more sensors proximate the front of the chassis capable of detecting level along the longitudinal direction at the front of the chassis and level along the lateral direction at the front of the chassis;
    a second one or more sensors proximate the rear of the chassis capable of detecting level along the longitudinal direction at the rear of the chassis and level along the lateral direction at the rear of the chassis;
    a controller operatively connected to the first one or more sensors, the second one or more sensors, and the plurality of lift mechanisms, the controller operating the plurality of lift mechanisms to level the chassis in response to level information received from the first one or more sensors and the second one or more sensors; and a control panel operatively connected to the controller and including at least a first input for controlling operation of the controller.

2. A medical equipment trailer as claimed in claim 1, wherein the control panel includes buttons for controlling operation of the controller and a display screen, the display screen being capable of displaying a level condition in a particular location of the trailer and direction.

3. A medical equipment trailer as claimed in claim 2, wherein the display screen can display the level orientation in at least the lateral direction at the front of the chassis, the lateral direction at the rear of the chassis, and the longitudinal direction at one of the front and the rear of the chassis.

4. A medical equipment trailer as claimed in claim 3, wherein the display displays an angle of inclination for at least one level orientation.

5. A medical equipment trailer as claimed in claim 2, wherein the control panel includes a button for scrolling through items of information on the display.

6. A medical equipment trailer as claimed in claim 2, wherein the control includes a directional keypad with front, rear, left and right buttons to actuate the plurality of lift mechanisms in pairs when a single button is depressed, and wherein each of the plurality of lift mechanisms has a corresponding light that indicates when the lift mechanism is being actuated.

7. A medical equipment trailer as claimed in claim 6, wherein the control includes indicator lights to indicate which of the buttons of the directional keypad to depress.

8. A medical equipment trailer as claimed in claim 6, wherein two buttons of the control panel can be depressed simultaneously to actuate a lift mechanism that is described by both buttons.

9. A medical equipment trailer as claimed in claim 1, wherein the control panel is operable to automatically level the trailer or to manually level the trailer by actuating the plurality of lift mechanisms the control panel having;

a manual button to select manual mode;

an extend button to select extension in manual mode and a retract button to select retract in manual mode;

a directional keypad having a front button, a rear button, a left button and a right button;

a first plurality of indicator lights that are illuminated to identify to a user which of the buttons of the directional keypad to press to level the trailer; and a second plurality of indicator lights each corresponding to one of the plurality of lift mechanisms, the second plurality of indicator lights illuminating to indicate when the corresponding lift mechanism is being actuated.

* * * * *